United States Patent

Fischer et al.

[11] Patent Number: 5,953,879
[45] Date of Patent: Sep. 21, 1999

[54] COMPOSITE ANCHOR

[75] Inventors: Artur Fischer, Waldachtal; Willi Haug, Freudenstadt, both of Germany

[73] Assignee: fischerwerke Artur Fischer GmbH & Co. KG, Waldachtal, Germany

[21] Appl. No.: 08/147,987

[22] Filed: Nov. 5, 1993

[30] Foreign Application Priority Data

Nov. 12, 1992 [DE] Germany .............................. 42 38 177

[51] Int. Cl.⁶ .................................................. E04B 1/38
[52] U.S. Cl. ............................ 52/704; 52/698; 405/259.6
[58] Field of Search .................. 52/698, 704; 405/259.5, 405/259.6

[56] References Cited

U.S. PATENT DOCUMENTS 3,618,326  11/1971  Montgomery ........................ 52/698 X
5,282,697   2/1994  Maechtle .............................. 52/704 X

FOREIGN PATENT DOCUMENTS 1312904  11/1973  United Kingdom .
1599918   7/1981  United Kingdom .

*Primary Examiner*—Creighton Smith
*Attorney, Agent, or Firm*—Michael J. Striker

[57] ABSTRACT

A composite anchor has an anchoring rod and a crushable cartridge filled with two components of a hardenable bonding agent which include a mineral mortar component and a water component separated from one another by crushable separating means. When the cartridge with the separating means is crushed by the anchoring rods the components are mixed by the anchoring rod in order to fix the anchoring rod in a drilled hole. The water component has a thixotropic agent which is paste-like unless it is subjected to shear forces.

4 Claims, 1 Drawing Sheet

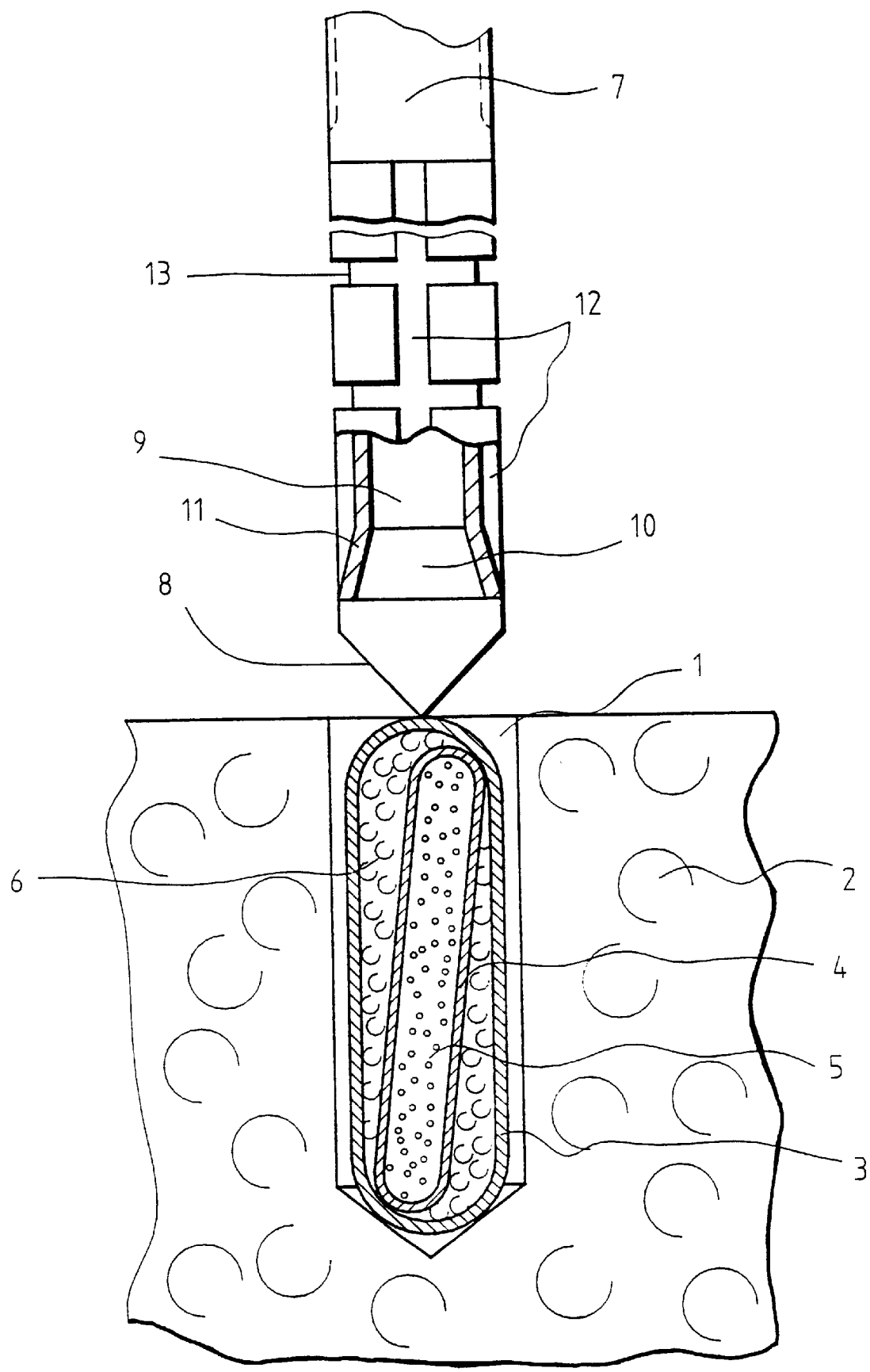

COMPOSITE ANCHOR

BACKGROUND OF THE INVENTION

The present invention generally relates to a composite anchor having an anchoring rod and a cartridge filled with two components of a hardenable bonding agent and crushable by the anchoring rod.

Anchors of the above mentioned general type are known in the art. One of such anchors is disclosed for example in the European patent document EP-A-502348. The composite anchor disclosed in this reference has a cartridge with a mineral mortar as one component and water as another component located in an inner container. The container has individual container sections which are distributed along its length and are individually crushable when the anchoring rod is driven in. Due to the distribution of water components over the entire length of the cartridge, the mortar is uniformly saturated with water and good mixing and hardening is to be achieved. However, the inner container has a very complicated construction and several uniformly distributed small containers for water which in some cases still have to be distributed in the cartridge with the aid of positioning means. Despite its very complicated configuration, it is still impossible to prevent an uneven distribution of the water component and some escape of the water, at least at the anchoring rod is put into position. As a result, the bonding agent is incompletely mixed especially with horizontally running bores and even more in overhead installations. The holding values of the anchoring rod are therefore extremely inconsistent and present a corresponding safety risk.

SUMMARY OF THE INVENTION

Accordingly, it is an object of the present invention to provide a composite anchor which avoids the disadvantages of the prior art.

More particularly, it is an object of the present invention to provide a composite anchor which allows uniform mixing of the bonding agent in any position of the drilled hole and its inner container has a simple configuration.

In keeping with these objects and with other which will become apparent hereinafter, one feature of the present invention resides, briefly stated, in a composite anchor which has an anchoring rod and a crushable cartridge filled with a mineral mortar and water, initially separated from one another by an inner container and mixed by the anchoring rod, wherein in accordance with the present invention the water component is composed of a thixotropic agent so that it is paste-like until it is subjected to shear forces.

The thixotropic agent in the water component makes it paste-like. When the cartridge is crushed, the water component in unable to escape, regardless of the way the drilled hole runs. Then the rotating anchoring rod generates the shear forces when it is inserted in the drilled hole, and the water component is liquified during advancement of the anchoring rod so that the bonding agent is uniformly impregnated and mixed. Both the powder-like mortar and the water are bonded in the paste-like mixture, so that none of the components can escape from the drilled hole during the mixing process, even in the case of overhead installations. Homogeneous mixing of the two components produces high holding forces of the anchoring rod when the bonding agent has hardened.

The cartridge and the two components of the bonding agent are composed of inorganic substances which create an ecologically safe product simultaneously meeting all fire safety requirements. A simple glass cylinder closable by fusion can be used as the inner container, so that the entire cartridge can be produced at a reasonable cost.

The thixotropic agent can be for example an amorphous, pyrogenic silicic acid, which is especially suitable for this purpose. It is admixed with the water component in a proportion of 0.5% to 10%. To ensure uniform distribution of the water component during the mixing process it is advisable to fill the inner container with the water component and to match the length of the inner container with the length of the inner space of the cartridge.

In accordance with a further feature of the present invention, it is advantageous to use an anchoring rod which, at its end facing the drilled hole has an expander cone widening toward the end and surrounded by an anchoring sleeve expandable by the expander cone. When tensile stress acts on the anchoring rod, the expander cone is drawn into the anchoring sleeve fixedly bonded into the drilled hole. Therefore, additional expansion forces are generated at the bottom of the drilled hole through the expander cone arranged on the anchoring rod. As a result, only compression forces act on the core of mortar which has hardened in the drilled hole, to increase the holding values in particular in the case of cracked concrete. Thereby the composite anchor in accordance with the present invention is suitable to be used in zones which are subject to tensile forces.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE of the drawing is a view showing a composite anchor in accordance with the present invention.

DESCRIPTION OF THE PREFERRED EMBODIMENTS

A composite anchor in accordance with the present invention has a cartridge which is identified with reference numeral 3 and positioned in a drilled hole 1 of a structure 2. The cartridge 3 is made of glass. An inner container 4 also made of glass is located inside the cartridge 3 and extends approximately over the whole length of the latter. The inner container 4 accommodates a water component 5 which has been thickened to form a paste with a thixotropic agent, for example amorphous pyrogenic silicic acid. This is achieved by a proportion of silicic acid of 0.5% to 10%. The space between the outer cartridge 3 and the inner container 4 is filled with mineral mortar 6 as a second component of a bonding agent. Both containers are closed by fusion of their open end.

The composite anchor further has an anchoring rod 7 for crushing the cartridge. For this purpose the anchoring rod 7 has a wedge-shaped tip 8. The anchoring rod 7 is screwed into the drilled hole with rotating means such as a drill machine, (schematically sown in the drawing) and generates shear forces which liquify the water that has been rendered thixotropic during the advancement of the anchoring rods. A paste-like mixture of the bonding agent is therefore produced immediately and prevents any escape particularly on the water component. It is therefor possible to use the inventive composite anchor even for overhead installation.

The anchoring rod 7 is screwed almost to the bottom of the drilled hole. Therefore the entire cartridge is crushed and the components of the bonding agents are thoroughly mixed with the glass splinters of the two containers of the cartridges. After the bonding agent has hardened, the anchoring rod 7 is fixedly bonded in the drilled hole 1 of the structure 2.

As can be seen from the drawing, the anchoring rod 7 has a reduced portion 9 and an expander cone 10 at its end which faces the drilled hole. An anchoring sleeve 11 composed for example of a plastic material surrounds the reduced portion 9 and the expander cone 10. The anchoring sleeve 11 has longitudinal grooves 12 and also circumferential grooves 13 spaced from one another by relatively large intervals, to improve bonding in the drilled hole. A tensile force acts on the anchoring rod 7 after it has been anchored and draws the expander cone 10 into the anchoring sleeve 11, particularly when the drilled hole has widened as a result of cracks forming. Therefore expansion forces act additionally on the anchoring sleeve 11. They press the anchoring sleeve against the wall of the drilled hole and the hardened core of the bonding agent, thus compensating for widening of the drilled hole and reinforcing the holding force. The special configuration both of the cartridge and the anchoring and of the anchoring rod makes the composite anchor in accordance with the present invention suitable for fixing in zones which are subject to tensile forces.

It will be understood that each of the elements described above, or two or more together, may also find a useful application in other types of constructions differing from the types described above.

While the invention has been illustrated and described as embodied in a composite anchor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A composite anchor, comprising a rotatable anchoring rod; a crushable cartridge filled with two components of a hardenable bonding agent which include a mineral mortar component and a water component separated from one another by crushable separating means provided with a thixotropic agent which is paste-like unless it is subjected to shear forces, said thixotropic agent being amorphous, pyrogenic silicic acid admixed with said water component in a proportion of 0.5% to 10%; and means for rotating said anchoring rod and screwing the latter into a drilled hole, so that when said cartridge with said separating means is crushed by said rotating anchoring rod said rotating anchoring rod generates shear forces which liquify said water component and said components are mixed by said rotating anchoring rod and produce a bonding agent which prevents any escape of said water component and fixes said anchoring rod in the drilled hole.

2. A composite anchor as defined in claim 1, wherein said amorphous, pyrogenic silicic acid is admixed with said water component in a proportion of 0.05 to 2%.

3. A composite anchor as defined in claim 1, wherein said cartridge includes an outer container, said separating means including an inner container located inside said outer container, said water component filling said inner container and having a length substantially corresponding to a length of an inner space of said outer container.

4. A composite anchor as defined in claim 1, wherein said anchoring rod has an elongated member with an expander cone provided at its end which faces a drilled hole and widening toward the latter, and an anchoring sleeve which surrounds said member and said expander cone and is expanded by said expander cone.

* * * * *